United States Patent [19]

Teti

[11] 4,065,011
[45] Dec. 27, 1977

[54] PORTABLE WATER SCOOP

[75] Inventor: John J. Teti, Saltville, Va.

[73] Assignee: Pyott-Boone Machinery, Corporation, Saltville, Va.

[21] Appl. No.: 720,103

[22] Filed: Sept. 3, 1976

[51] Int. Cl.² .............................................. E02F 3/81
[52] U.S. Cl. .............................. 214/146 E; 137/344; 214/145 R
[58] Field of Search ............... 214/145 R, 767, 510, 214/146 E, 82; 137/344; 280/5 R

[56] References Cited

U.S. PATENT DOCUMENTS

| 3,121,502 | 2/1964 | Schroeder | 214/510 |
| 3,788,507 | 1/1974 | Voss | 214/146 E |
| 3,917,089 | 11/1975 | Eriksson | 214/146 E |
| 3,937,345 | 2/1976 | Countryman | 214/510 |

Primary Examiner—Robert J. Spar
Assistant Examiner—Ross Weaver
Attorney, Agent, or Firm—Robert D. Yeager; Howard G. Massung

[57] ABSTRACT

A water scoop constructed for use in conjunction with the scoop bucket of a rubber tired self-powered mining vehicle for collection, transporting and discharging water. The disclosed water scoop is constructed to engage the discharge blade on the scoop bucket so that when it is to be used it can be drawn into the bucket. The water scoop is a generally closed vessel having a configuration to fit in the scoop bucket. Vents are provided in the top rear portion of the water scoop to allow trapped air to escape as the water scoop is filled. A relatively large gate is provided across the exposed end of the water scoop and it is positionable to allow the passage of water. The gate of the bucket can be operated by a hydraulic cylinder which is powered by the hydraulic power unit which operates the scoop discharge blade. During use with the water scoop drawn within the scoop bucket, the hydraulic attachments to the blade operating cylinders are disconnected and attached to the hydraulic gate cylinder. Baffles are provided internal in the water scoop vessel to prevent water surges when the mining vehicle changes direction or speed. The bucket, containing the water scoop, is positionable by an operator to be easily positioned in a pool of water which is to be drained.

11 Claims, 10 Drawing Figures

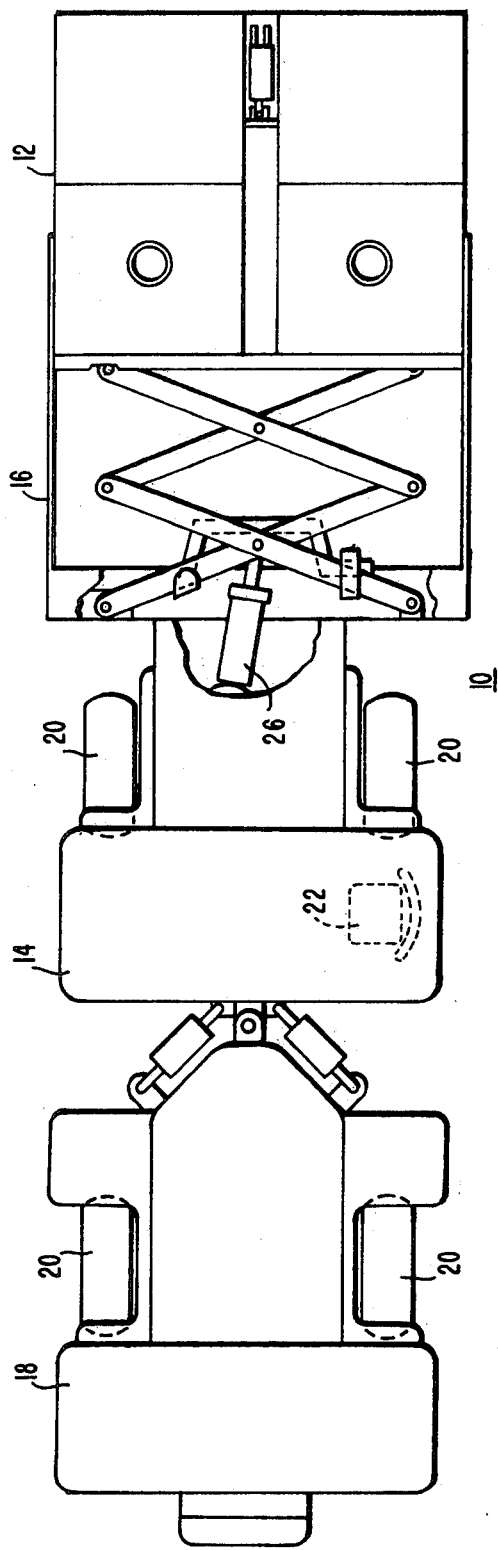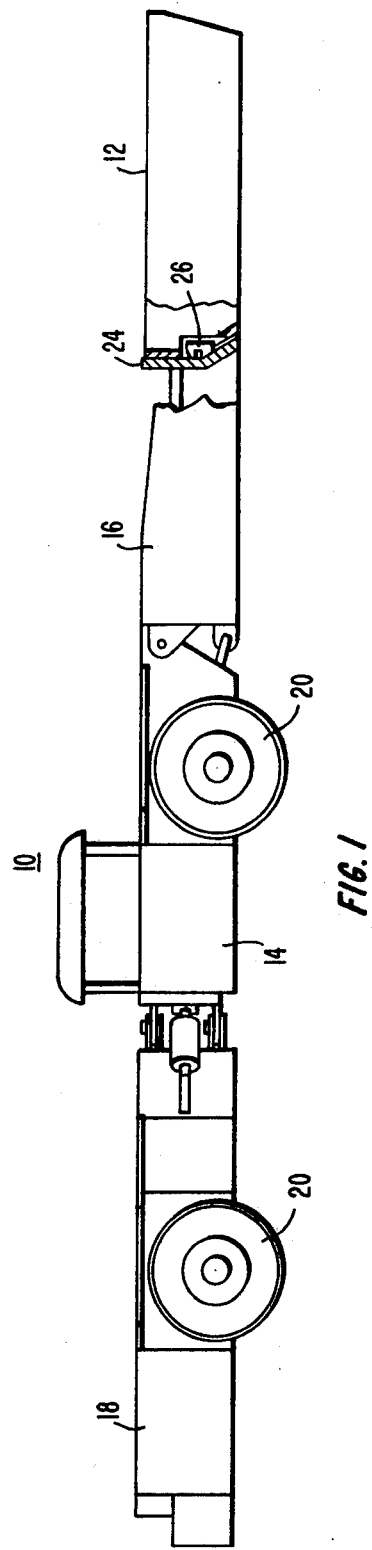

PORTABLE WATER SCOOP

BACKGROUND OF THE INVENTION

1. Field of the Invention

This invention relates to apparatus for collecting, transporting and discharging water and more particularly to a water scoop vessel adapted for use with a rubber tired self-powered mining vehicle.

2. Description of the Prior Art

Rubber tired self-propelled scoop vehicles are often used in mining for removing minerals. These vehicles are rather versatile and can be maneuvered throughout the mine. Power distribution underground is a very expensive part of mining and any elimination or reduction in the required wiring is desirable. Reducing the wiring provides not only a savings for the mine operator but also reduces the hazard associated with the wiring itself. Thus, there are often parts of a mine which do not have permanent wiring installed and installation of a sump pump would be difficult and expensive.

Because of the undulation of coal and mineral seams, often a pocket of water will collect, sometimes from floor to roof in the mine. These pools of water are particularly inclined to form in concave undulations of the mine bottom from seepage following heavy rainfall. Before work in the mine can continue, it is necessary to remove this collected water. Frequently these pools are isolated from a power source and would have to have power run to them for installation of a pump. Alternately a portable battery powered pump can be used to lower the water to a level low enough so that work in the mine can continue or a proper drainage system can be installed. A battery powered pump requires personnel to monitor the condition of battery charge.

These pools of water while being troublesome to drain are often formed only a very short distance from the natural or pump drainage system. The water scoop attachment disclosed permits the self-propelled scoop vehicle to quickly drain these water pickets after which it can return to the normal duties of cleanup, supply, construction or transporting coal.

SUMMARY OF THE INVENTION

A self-powered mine vehicle adapted for collecting, transporting and discharging water wherein a sealable vessel is disposed within the positionable bucket of a mining vehicle. The water scoop or vessel has a power gate at the exposed end which is opened when collecting or discharging water. The gate is of a large rectangular shape with a piano type hinge formed along the upper edge. The gate can be pivoted internal of the water scoop around the hinge. During transporting of the water load, the gate is closed, providing essentially a water tight seal for the vessel. A vent is provided in the container to facilitate water movement. Baffles are provided internal of the container to limit water surges during movement of the mine vehicle.

Water pockets often form in mines relatively close to drainage. The disclosed water scoop, operable with a scoop traction vehicle permits the transfer of large amounts of water such as a thousand gallons in a short period of time, such as 15 or 20 seconds. The disclosed vehicle is particularly suitable for use in mining since the water collected need be transported only a relatively short distance. The water scoop or container is shaped to the contour of the scoop bucket with the back end shaped to match the scoop blade. A pocket for engagement with the hook on the scoop blade is provided for easy drawing of the water container within the scoop bucket. The self-powered scoop machine is provided with a hook or connector on the scoop blade to permit supplies and materials to be drawn into the bucket. This hook is used for engaging and drawing the water scoop into the bucket. When the tank is properly located within the scoop, hydraulic hoses for connecting power to the blade are detached from the blade operating cylinder and connected to the gate operating cylinder. Thus, the controls for the scoop discharge blade are then used to operate the water gate. This serves the dual purpose of providing a convenient way to power the water scoop gate and also serves as a safety device to prevent the operator from accidentally pushing the water scoop out of the bucket during operation. With the water scoop in the bucket and the hydraulic hoses connected, the self-powered vehicle is ready for water transfer.

The water scoop is vented towards the rear with two relatively large diameter internal vent pipes. These pipes are provided with a number of small holes formed therein to permit venting and thus filling of water to the top of the tank. These internal pipes with openings formed therein prevent an undue amount of water from sloshing out of the vent holes as the water scoop is moved. Baffles are provided in the tank to prevent water surges when the tractor reverses direction or changes speed. Without the baffles the surges developed within the water container could be great enough to cause sliding of the tank within the bucket. The gate is disposed with a slope and opens into the bucket. By thus positioning the gate, water pressure and gavitity help maintain the gate in a closed position. The gate is provided with a rubber belting gasket or seal on three sides and, if necessary, over the joint of the piano-type hinge. Normally the small amount of leakage through the hinge is of little importance underground.

The opening of the tank around the gate is free of framing normally used to make a good seal. Framing would collect mud picked up by the water and prevent an adequate seal when the gate is in the closed position. The bottom portion of the water scoop sealed by the gate is thus flat and free from obstructions. As water is discharged from the water scoop vessel, any accompanying mud or debris is carried away.

During operation with the gate open, the vehicle is advanced into the collected water as far as possible. The gate on the water scoop is open until the water scoop is filled and then the gate is closed. The powered vehicle is then backed away from the pool and transfers the water contained in the scoop to a natural or pump drained system. When the vehicle is in position where there is adequate drainage, the gate is opened for immediate discharge of the collected water. The water is rapidly discharged clearing the water scoop. By repeating this operation, the water pool may be rapidly drained to the point where mine laws permit men to work in the flooded area to install a proper drainage system.

In one embodiment of the invention, a rubber tired self-powered mine vehicle has a positionable bucket supported therefrom with a hydraulically operated blade disposed in the bucket. A hook is formed on the hydraulically operated blade which can engage a mating pocket formed in the water scoop for drawing the water scoop into the bucket. The water scoop is constructed to fit the contour of the scoop bucket. The exposed end of the water scoop container is provided with a relatively large gate which is operable between an open position and a closed sealing position. The gate can be hydraulically operated by the same hydraulic operating means which controls operation of the discharging bucket blade.

In another embodiment of the invention a water scoop is provided for use with a self-powered rubber tired vehicle when the water scoop is formed from a closed vessel adapted for retaining water and having a contour to fit the scoop bucket. A connection is provided for connecting the water scoop to the power discharge blade of the bucket for drawing the water collecting vessel into the bucket. The power discharge blade can be operated by a simple hydraulic cylinder, a telescopic cylinder, a rack and pinion gear, or other suitable arrangement. A sealable opening is formed at the end of the collecting vessel and is exposed when the water scoop is disposed in the scoop bucket. A gate is provided movable between an open position, uncovering the sealable opening, and a closed position, closing and sealing the opening. The gate is of a relatively large area and is hinged for movement inside of the vessel. The seal around the hinge gate is sloped and thus, gravity and water retained within the vessel provide force to keep the gate in the closed position. Power for operating the gate is obtained from the operator for the scoop discharge blade. A vent is formed in the top of the water vessel for permitting the passage of air. Baffles are disposed within the water collecting vessel to limit water surges as the vessel is moved.

The disclosed water scoop thus converts a mine vehicle, which is used for handling mine material to a water transporting vehicle which can rapidly and easily move a large volume of water.

It is an object of this invention to teach a self-powered water moving apparatus which can be lowered into a pool of water, opened to collect the water, sealed and driven to a water discharge area.

It is a further object of this invention to teach a water collecting vessel, for use in a mine, adapted for use with a scoop mining vehicle and being configured to fit within the power scoop bucket for collecting, transporting and discharging mine water.

BRIEF DESCRIPTION OF THE DRAWINGS

For a better understanding of the invention, reference may be had to the preferred embodiment, exemplary of the invention, shown in the accompanying drawings, in which:

FIG. 1 is a side view of a scoop tractor with a water scoop vessel partially drawn within the scoop bucket constructed according to the teaching of the present invention;

FIG. 2 is a top view of a scoop tractor as shown in FIG. 1;

SUMMARY OF THE INVENTION

Figure 3:
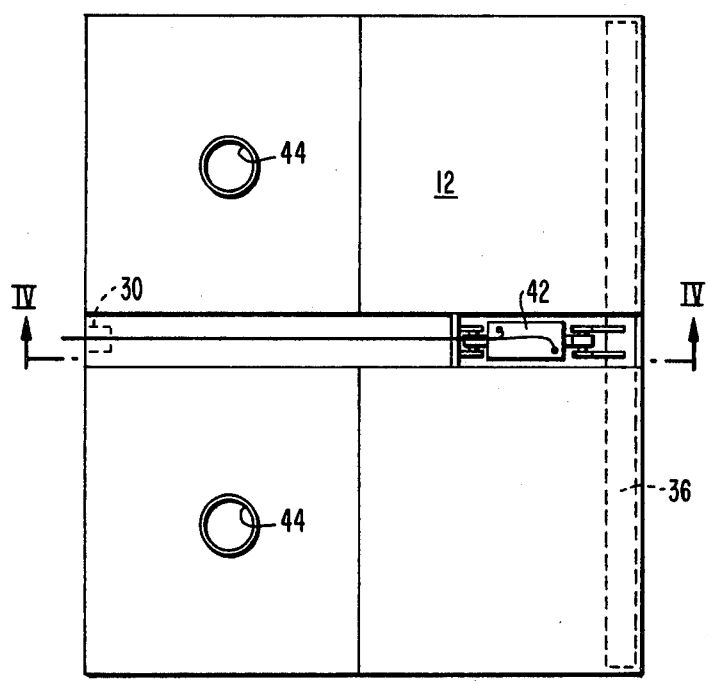
FIG. 3 is a top view of a water scoop vessel utilizing the teaching of the present invention.

Referring now to the drawings and FIGS. 1 and 2 in particular, there is shown a self-propelled rubber tired mine vehicle 10 including a water scoop vessel 12 utilizing the teaching of the present invention. The entire mine vehicle 10 includes a traction unit 14 having a scoop bucket 16 supported from the front end thereof. The power unit 18 is provided at the rear end of the scoop vehicle 10. Power unit 18 supplies power to drive motors for driving wheels 20. Wheels 20 are formed of rubber and permit vehicle 10 to be driven to various necessary locations. The vehicle is operated by an operator who sits in seat 22. The operator drives the vehicle 10 as well as operates scoop bucket 16. A movable discharge blade 24 is located within scoop bucket 16. Discharge blade 24 is movable between a retracted position in proximity to the rear of bucket 16 and an extended position in proximity to the open end of bucket 16, by hydraulic cylinder 26. While a hydraulic cylinder is shown for moving blade 24 other operating devices can be used if desired. Hydraulic cylinder 26 acts through an appropriate scissor arrangement for positioning blade 24.

Referring now to FIGS. 3 through 6 there are shown detailed drawings of the water scoop vessel 12 adapted for use with the scoop vehicle 10. Water scoop vessel 12 can be engaged by a hook 28 formed on blade 24, to be drawn into the scoop bucket 16. Scoop vessel 12 includes a pocket 30 which can be engaged by hook 28. As discharge blade 24 is retracted, water scoop vessel 12 is drawn into scoop bucket 16. The end of water scoop vessel 12 drawn within scoop bucket 16 is configured to match the discharge blade 24. That is, the rear end 32 of vessel 12 matches the exposed front of blade 24. The sides of vessel 12 are vertical and the vessel is wide enough to fit with a fairly close tolerance within bucket 16. Since the rear end 32 of vessel 12 matches closely the discharge blade contour when they are in contact, little sideward movement is possible. Thus the water scoop 12 can easily be drawn straight back into bucket 16.

The front end 34 of water vessel 12 is exposed when vessel 12 is within bucket 16. A water gate 36 is provided across the front end 34. Gate 36 forms a large portion of end 34. Gate 36 is pivotable around hinge 38 between a closed position sealing end 34 and an open position uncovering a relatively large opening in end 34. End 34 includes a large opening 40 formed therein which is covered or unocvered by gate 36. Hydraulic cylinder 42 is provided for operating gate 36.

During operation when the water vessel 12 is drawn within bucket 16, the hydraulic connections for supplying power to hydraulic cylinder 26 are disconnected and reconnected to gate operating cylinder 42. Thus the same controls which operate blade 24 will operate gate 36 when the water scoop 12 is in position and ready for use. This permits one operator control to be used for either function depending on the use of vehicle 10. It also provides a safety feature in that the scoop 12 cannot be accidentally discharged from the bucket 16 since the discharge blade operating cylinder 26 is disconnected during use of the vehicle 10 for water transfer.

Vents 44 are provided in the top rear of water vessel 12 for allowing air to enter or leave vessel 12 as water is received or discharged. Vents 44 are formed from relatively large diameter pipes extending within water scoop 12. The pipes 45 have numerous small diameter holes formed therein. Water does not readily spill from the vent 44 as scoop 12 is moved. Baffles 46 are provided within water scoop vessel 12 for limiting water surge as the vessel is moved. If baffles 46 were not provided, surges generated during vehicle movement could shift water scoop 12 within bucket 16. Without these baffles much more care would be required in maneuvering vehicle 10 and the operating speed would be restricted.

Figure 10:
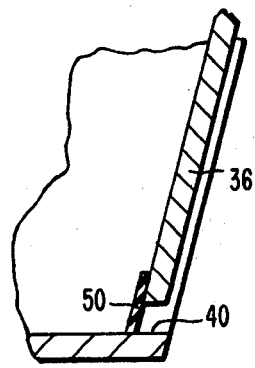

A trough 48 extends longitudinally along the top of scoop car 12. Hydraulic hoses and hydraulic cylinder 42 are disposed within trough 48. Trough 48 provides protection for the hydraulic hoses and the hydraulic cylinder 42. A gasket 50, as can best be seen in FIG. 10, is formed around the edge of water gate 36 to reduce leakage while transporting water. The gasket is normally formed on three sides of gate 36 since the leakage around the hinge 38 is relatively small. If desired, gasketing can also be provided along gate 36 near the axes of hinge 38.

Figure 9:
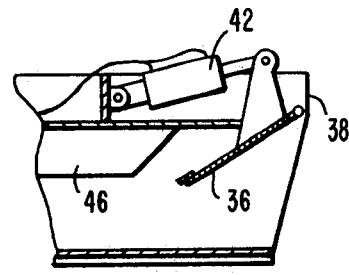
FIG. 9 is a view similar to FIG. 6 but with the water gate in the open position; and, FIG. 10 is an enlarged view of a portion of FIG. 4 showing the gate seal.

Gate 36 has pivot arm 52 connected thereto. Pivot arm 52 is pivotally connected to the operating rod of hydraulic cylinder 42. As shown in FIG. 9 when the rod of hydraulic cylinder 42 is extended, gate 34 is pivotally moved on hinge 38 to an open position permitting free water flow through the exposed end 34. Tank skids 54 are provided on the bottom of tank 12 to facilitate sliding movement thereof.

Water gate 36 covers substantially the whole exposed end 34 of tank 12 below the trough. The sides and bottom of end 34 are free of angles or bracing which would tend to collect mud or dirt and prevent a good water seal. Thus as water flows into or out of water scoop 12 there is no accumulation of mud or other debris around the gate opening 40. This is necessary since the water may be dirty and material could collect around opening 40 if it was not properly formed. Collected material could prevent a proper seal of gate 36 to opening 40.

Figure 4:
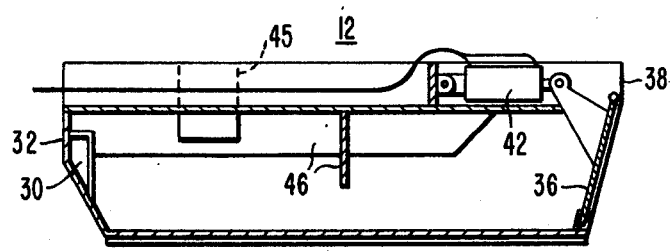
FIG. 4 is a section view along the line V—V of the water scoop vessel shown in FIG. 3.
Figure 6:
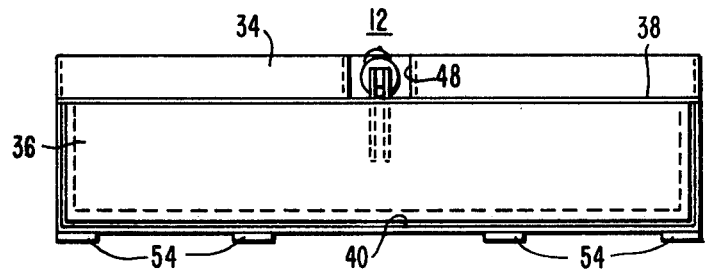
FIG. 6 is a right end view, of the vessel shown in FIG. 3, showing the exposed end of the water scoop vessel when positioned in the bucket.
Figure 5:
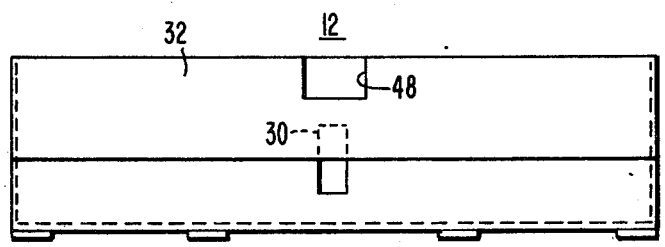
FIG. 5 is a view of the end of the water scoop vessel which is drawn into the bucket of the mine vehicle.
Figure 7:
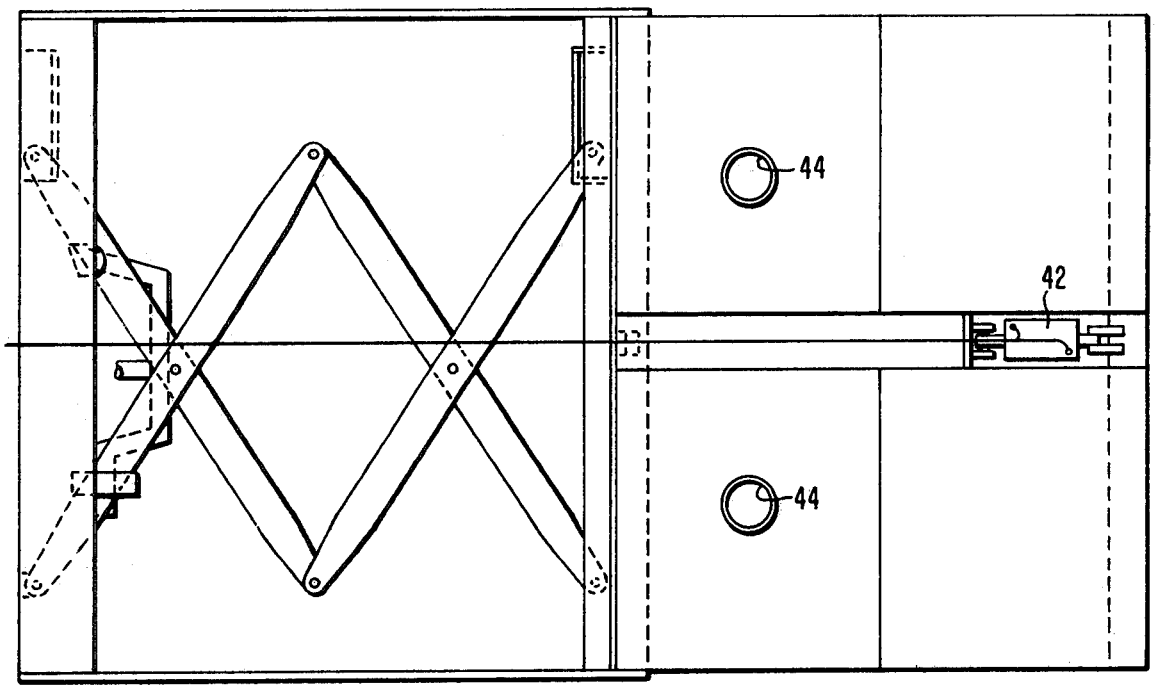
FIG. 7 is a view of the bucket portion of the scoop vehicle in FIG. 2 with the discharge blade extended and engaging the water scoop vessel.
Figure 8:
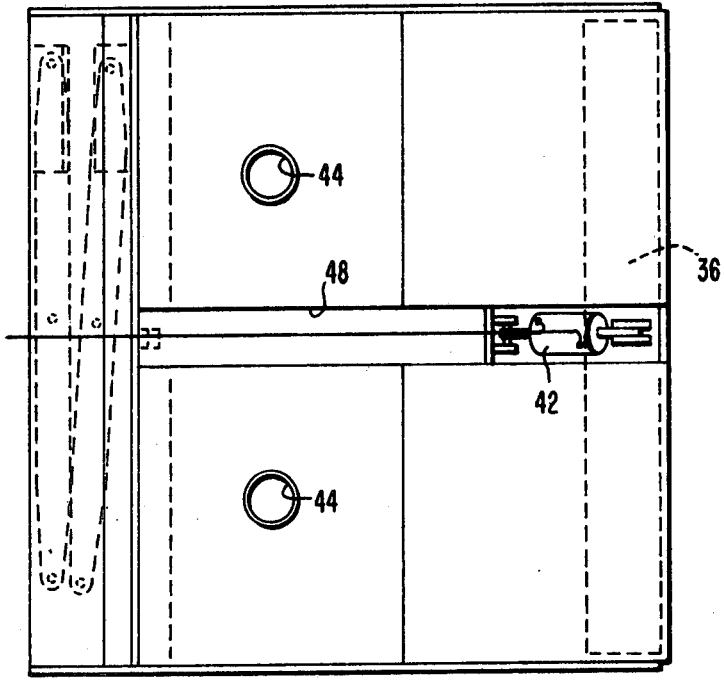
FIG. 8 is a view similar to FIG. 7 but with the discharged blade retracted and the water scoop drawn within the bucket with the gate of the water scoop in the open position.

During operation the discharge blade 34 is extended and the bucket 16 is positioned so that hook 28 engages the pocket 30 of water scoop 12. Since the rear end 32 of water scoop 12 is shaped to fit the contour of blade 24 with hook 28 engaging pocket 30 sideward motion or pivotal movement on hook 28 is prevented. The discharge blade 24 is then retracted and water scoop 12 is drawn straight back into bucket 16. The sides of water scoop 12 fit closely within the sides of bucket 16. With blade 24 retracted and water scoop 12 drawn within bucket 16, end 34 is exposed through the open end of bucket 16. The hydraulic hose connections from the hydraulic power pump to discharge blade cylinder 26 are disconnected from cylinder 26 and reconnected to gate operating hydraulic cylinder 42. Thus, discharge blade 28 is rendered inoperative and remains in the full retracted position. The hydraulic hoses for operating cylinder 42 are disposed within trough 48. The control for blade 28 then is operable to control positioning of water gate 36. Gate 36 is positionable by operating hydraulic cylinder 42 to a closed position, as shown in FIG. 4, substantially sealing end 34, and an open position, shown in FIG. 9, essentially opening all of end 34. During operation, the scoop bucket 16 can be positioned as desired. With water gate 36 in the open position the scoop vehicle is advanced into the collected water pocket until scoop tank 12 is filled. With water scoop 12 filled, the operator closes gate 36 to seal water scoop 12. Scoop vehicle 10 is then backed away from the water pool and moved to a position where adequate drainage is provided. The operator then uses the discharge blade control to open the water gate and discharge the collected water. By repeating this operation the pool of collected water may be drained to a point where mine laws permit men to work in the area to install proper drainage systems.

After the water pool has been drained, the scoop vehicle 10 is driven to the storage location for water scoop 12. The hydraulic operating hoses are then disconnected from gate operating cylinder 42 and reconnected to discharge blade operating cylinder 26. The operator then causes blade 24 to move to the extended position, pushing water scoop 12 from scoop bucket 16. The self-propelled rubber tired mine vehicle can then return to duties of cleanup, supply, construction or transporting coal.

The water scoop 12 is of a relatively large capacity and in the embodiment as shown it is constructed to hold a thousand gallons of water. In actual practice natural drainage or pump drainage is normally existing in close proximity to where the water pocket is formed. The water scoop 12 thus permits the transfer of a thousand gallons of water in a relatively short time such as 15 or 20 seconds.

Water gate 36 is pivotally mounted to the inside of tank 12 and is sloped in such a manner as to be assisted by water pressure and gravity to maintain it in a closed position. Hydraulic operating cylinder 42 can power gate 36 both in opening and closing, although it is not necessary to be powered to close in operation. Scoop vehicle 10 can be moved to the desired discharge position and bucket 16 positioned so that the water is discharged in a selected area when water gate 36 is opened. By disconnecting hydraulic cylinder 26 and reconnecting the operating hydraulic unit therefor to hydraulic gate operating cylinder 42, blade 24 is rendered inoperative and the operator cannot accidentally push water scoop 12 from scoop bucket 16.

Water scoop 12 has a low profile and this is advantageous in a mine with limited head room. The trough 48 provides protection for the hydraulic cylinder 42 and the associated hoses. Providing vent pipes 45 as shown also reduces the required clearance for water scoop 12. The apparatus for water scoop 12, as shown, is thus self-contained within the water scoop body.

What is claimed is:

1. A self-powered rubber tired operator controlled mine vehicle for collecting, transporting and discharging water comprising:

a scoop bucket, having an open end and a closed end, supported on one end of the mine vehicle;

a blade, which is hydraulically operated, disposed within said scoop bucket movable between an extended position in proximity to the open end of said scoop bucket and a retracted position, in proximity to the closed end of said scoop bucket;

a hook formed on said hydraulically operated blade;

a water scoop, defining a generally closed vessel, having a pocket formed therein adapted to engage said hook and being formed to fit the contour of said scoop bucket and said blade to permit being drawn into said scoop bucket when engaged by said hook and said hydraulically operated blade is retracted;

said water scoop having a pocket formed therein adapted to engage said hook and being formed to fit the contour of said scoop bucket when engaged by said hook and said hydraulically operated blade is retracted;

said water scoop having a sealable opening formed in one end thereof through which water can flow when unsealed; and, gate means operable in response to the vehicle operator for opening and closing the sealable opening formed in said water scoop.

2. A vehicle as claimed in claim 1 wherein said water scoop comprises:
a hydraulic gate operator connected to said gate means for positioning said gate means at an open or closed position.

3. A vehicle as claimed in claim 2 wherein said water scoop further comprises:
vents formed in the closed top of said water scoop for venting air as said water scoop is filled; and,
baffles provided within said water scoop to limit water surges as the vehicle is moved.

4. A vehicle as claimed in claim 1 wherein said water scoop comprises:
a generally closed vessel having a sloped exposed end which defines said sealable opening;
said sealable opening being of a generally elongated rectangular shape; and,
said gate hinged along the top of said sealable opening and adapted for pivotal movement to the inside of said water scoop.

5. A vehicle as claimed in claim 4 comprising:
a first hydraulic operator for operating said gate;
a second hydraulic operator for operating said blade;
hydraulic supply means for supplying hydraulic fluid under pressure to operate said gate and said blade; and,
hydraulic connecting means for connecting said hydraulic supply to either the hydraulic operator for said blade or the hydraulic operator for said gate.

6. A vehicle as claimed in claim 5 wherein said scoop car comprises:
a vent formed in the top of said water scoop for venting air as water flows into the water scoop; and,
baffles formed internal of said water scoop to limit water surges within said water scoop.

7. A water scoop adapted for use with a self-powered rubber tired scoop tractor having a movable scoop bucket, with a power discharge blade formed therein, comprising:

a closed vessel adapted for retaining water and having a contour formed to fit in the scoop bucket;
connecting means for connecting the water scoop to the power discharge blade to draw the water scoop into the scoop bucket as the power discharge blade is retracted;
a sealable opening formed at one end of the water scoop exposed when the water scoop is disposed in the scoop bucket; and,
gate means movable between an open position, uncovering said sealable opening to permit water flow, and a closed position, covering said sealable opening to retain water in the water scoop.

8. A water scoop as claimed in claim 7 wherein:
the exposed end of the water scoop includes a sloped portion;
the sealable opening forms a relatively large rectangular portion of the exposed end; and,
said gate is hinged at the top of the rectangular opening for pivotal movement within the water scoop.

9. A water scoop as claimed in claim 8 comprising:
an elongated trough formed in the top of the water scoop;
a hydraulic cylinder for operating said gate means disposed within the elongated trough; and,
a hydraulic power source having hydraulic lines extending through said elongated trough to said hydraulic gate cylinder.

10. A water scoop as claimed in claim 8 comprising:
a vent formed in the top of the water scoop for permitting the escape of air as water flows into the water scoop; and,
baffles disposed within the water scoop to limit water surges as the water scoop is moved.

11. An operator controlled vehicle for collecting, transporting and discharging water comprising:
a plurality of rubber tires for supporting the vehicle from the ground;
a power supply contained within the vehicle for providing self-powered movement of the vehicle;
steering means for directing movement of the vehicle in response to the control of the operator;
a vessel supported in front of the vehicle having a front end with an opening formed therein;
positioning means connected to said vessel for permitting positioning of the vessel supported at the front end of the vehicle in response to operator control;
a gate connected on said vessel, movable between a raised position uncovering the vessel opening and a lowered position covering the vessel opening; a closed top on said vessel having inwardly extending vents formed therein; and, baffels formed internal of said vessel to limit surges within said vessel;
a gate operator responsive to operator control for positioning said gate at the desired position.

* * * * *